US010094577B2

(12) United States Patent
Dennis (10) Patent No.: US 10,094,577 B2
(45) Date of Patent: Oct. 9, 2018

(54) SOLAR ENERGY SYSTEM

(71) Applicant: ENDLESS SOLAR CORPORATION LTD, Melbourne, Victoria (AU)

(72) Inventor: Michael Dennis, Melbourne (AU)

(73) Assignee: Endless Solar Corporation Ltd, Melbourne, Victoria (AU)

(*) Notice: Subject to any disclaimer, the term of this patent is extended or adjusted under 35 U.S.C. 154(b) by 420 days.

(21) Appl. No.: 14/407,055

(22) PCT Filed: Jun. 11, 2013

(86) PCT No.: PCT/AU2013/000620
§ 371 (c)(1),
(2) Date: Dec. 10, 2014

(87) PCT Pub. No.: WO2013/185172
PCT Pub. Date: Dec. 19, 2013

(65) Prior Publication Data
US 2015/0159885 A1    Jun. 11, 2015

(30) Foreign Application Priority Data
Jun. 12, 2012  (AU) ................. 2012902454

(51) Int. Cl.
*F25B 27/00*  (2006.01)
*F24D 12/02*  (2006.01)
(Continued)

(52) U.S. Cl.
CPC .............. *F24D 12/02* (2013.01); *F01K 13/00* (2013.01); *F24D 11/003* (2013.01);
(Continued)

(58) Field of Classification Search
CPC .. F25B 9/08; F25B 2400/0407; F25B 27/002; F25B 27/005; F25B 7/00
See application file for complete search history.

(56) References Cited

U.S. PATENT DOCUMENTS 4,007,776 A    2/1977 Alkasab
4,128,124 A    12/1978 Worthington
(Continued)

FOREIGN PATENT DOCUMENTS

| AT | 412 911 B | 8/2005 |
|---|---|---|
| CN | 1807995 A | 1/2005 |

(Continued)

OTHER PUBLICATIONS

International Search Report dated Aug. 20, 2013 in International Application No. PCT/AU2013/000620, filed Jun. 11, 2013.
(Continued)

*Primary Examiner* — Orlando E Aviles Bosques
(74) *Attorney, Agent, or Firm* — Knobbe, Martens, Olson & Bear, LLP (57) ABSTRACT

The present disclosure provides a solar energy system that comprises a solar collector for providing energy generated from incident solar radiation. The solar energy system also comprises a first heat exchange system that has an ejector that is arranged to operate using at least a portion of the energy provided by the solar energy collector. Further, the solar energy system comprises a second heat exchange system arranged to operate using energy from an energy source other than a solar energy source. The solar energy system is arranged for transfer of thermal energy between the first heat exchange system and a region, and between the second heat exchange system and the region. The solar energy system is arranged to control a relative contribution of the first and second heat exchange systems to the transfer of the thermal energy.

18 Claims, 4 Drawing Sheets

(51) Int. Cl.
*F24S 60/00* (2018.01)
*F25B 9/08* (2006.01)
*F25B 7/00* (2006.01)
*F24D 11/00* (2006.01)
*F24D 19/10* (2006.01)
*F24D 17/00* (2006.01)
*F24D 11/02* (2006.01)
*F24D 17/02* (2006.01)
*F01K 13/00* (2006.01)
*F24S 10/00* (2018.01)
*F24F 5/00* (2006.01)
*F25B 13/00* (2006.01)
*F25B 40/04* (2006.01)

(52) U.S. Cl.
CPC ...... *F24D 11/0221* (2013.01); *F24D 17/0015* (2013.01); *F24D 17/0021* (2013.01); *F24D 17/02* (2013.01); *F24D 19/106* (2013.01); *F24D 19/1042* (2013.01); *F24D 19/1078* (2013.01); *F24F 5/0046* (2013.01); *F24S 10/00* (2018.05); *F24S 60/00* (2018.05); *F25B 7/00* (2013.01); *F25B 9/08* (2013.01); *F25B 27/002* (2013.01); *F24D 2200/123* (2013.01); *F24D 2200/14* (2013.01); *F24F 2005/0064* (2013.01); *F25B 13/00* (2013.01); *F25B 27/005* (2013.01); *F25B 40/04* (2013.01); *F25B 2313/003* (2013.01); *F25B 2313/021* (2013.01); *F25B 2339/047* (2013.01); *F25B 2400/0407* (2013.01); *F28F 2250/08* (2013.01); *Y02B 10/20* (2013.01); *Y02B 10/70* (2013.01); *Y02B 30/125* (2018.05); *Y02E 10/44* (2013.01)

(56) References Cited

U.S. PATENT DOCUMENTS

| | | | |
|---|---|---|---|
| 4,173,994 A * | 11/1979 | Hiser | F25B 27/002 62/500 |
| 4,374,467 A * | 2/1983 | Briley | F25B 27/005 62/500 |
| 4,527,618 A | 7/1985 | Fyfe et al. | |
| 4,718,403 A | 1/1988 | McCall | |
| 2011/0048502 A1 | 3/2011 | Kikinis et al. | |
| 2011/0289953 A1 | 12/2011 | Alston | |

FOREIGN PATENT DOCUMENTS

| | | |
|---|---|---|
| CN | 101871440 | 10/2010 |
| EP | 1 962 024 A2 | 8/2008 |
| JP | 1976-063544 | 6/1976 |
| JP | 1977-019446 | 2/1977 |
| JP | 59-134432 | 8/1984 |
| JP | 59-145669 | 9/1984 |
| JP | 60-37777 | 3/1985 |
| JP | 2007-170690 | 7/2007 |
| JP | 2011-085331 | 4/2011 |
| JP | 2011-133123 | 7/2011 |

OTHER PUBLICATIONS

Office Action received in Chinese Application No. 201380031207.9 dated Oct. 18, 2016.
Huang, B.J., et al., Huang, B. J., et al. "Collector selection for solar ejector cooling system." *Solar Energy* 71.4 (2001): 269-274.

* cited by examiner

SOLAR ENERGY SYSTEM

FIELD OF THE INVENTION

The present invention relates to a solar energy system that includes a solar energy collector and an ejector.

BACKGROUND OF THE INVENTION

The operation of conventional cooling systems, such as air conditioning and refrigeration units, requires a considerable amount of electrical energy. The electrical energy is often generated using power stations that burn fossil fuel and consequently emit undesirable pollutants and greenhouse gases.

Photovoltaic solar panels may be used to convert sunlight into electrical energy that can be used to operate a compressor of a cooling system. This may reduce the need for fossil fuels, but the efficiency is relatively low and the capital cost is relatively high. Cooling systems that are operated using thermal solar energy and have ejectors instead of corresponding conventional electrical components are an alternative.

However, solar energy is not available at a consistent level and providing a solar energy system that can cater for heating and/or cooling requirements even if the availability of solar energy is low has proven to be a challenge.

SUMMARY OF THE INVENTION

In accordance with a first aspect of the present invention there is provided a solar energy system comprising:

a solar collector for providing energy generated from incident solar radiation;

a first heat exchange system comprising an ejector that is arranged to operate using at least a portion of the energy provided by the solar energy collector; and a second heat exchange system arranged to operate using energy from an energy source other than a solar energy source;

wherein the solar energy system is arranged for direct or indirect transfer of thermal energy between the first heat exchange system and a region, and between the second heat exchange system and the region; and wherein the solar energy system is arranged to control a relative contribution of the first and second heat exchange systems to the transfer of the thermal energy.

The solar energy system typically is arranged such that the second heat exchange system supplements the operation of the first heat exchange system when the contribution of the first heat exchange system to the transfer of thermal energy is insufficient for an operation condition of the solar energy system.

The thermal energy may be transferred to or from the first heat exchange system and the second heat exchange system resulting in heating or cooling of the region, respectively.

The first heat exchange system may be arranged such that an operation mode of the first heat exchange system is selectable between a first mode for heating the region and a second mode for cooling the region.

In one example, the first heat exchange system comprises an ejector circuit and is arranged for bypassing at least a portion of the ejector circuit in the first mode of operation and is arranged such that the portion of the ejector circuit is not bypassed in the second mode of operation.

The second heat exchange system typically is arranged for operation using electrical energy and may comprise an electrical compressor.

The second heat exchange system may also be arranged for selecting between a first mode for heating the region and a second mode for cooling the region. In one example, the second heat exchange system is a reverse cycle heat exchange system and may be a split system heat exchange system.

The solar energy system may also comprise a water heating system for heating water and may be arranged to transfer heat to the water heating system from the energy obtained by the solar collector.

In one embodiment, the solar energy system is arranged such that a portion of thermal energy generated from incident solar radiation is provided to the first heat exchange system, and at least a portion of remaining thermal energy generated from incident solar radiation is provided to the water heating system.

The solar energy system may further comprise an energy storage arrangement for storing energy that is provided by the first heat exchange system and/or the second heat exchange system, and the solar energy system may be arranged to use at least a portion of energy stored in the energy storage for cooling or heating the region. The energy storage may be arranged for storing thermal energy by transferring the thermal energy to a suitable solid or a fluid.

In one embodiment the solar energy system is arranged arranged such that the first heat exchange system is used for heating or cooling and only if a heating or cooling contribution of the first heat exchange system is insufficient for reaching a preselected or predetermined cooling or heating condition (such as a selected temperature to which the region should be heated or cooled), the second heat exchange system is used to supplement the operation of the first heat exchange system. The solar energy system solar heat exchange system may be controlled such that a heating or cooling contribution of the first heat exchange system is substantially maximised dependent on operation conditions (such as an intensity of sunlight that is incident on the solar collector) before the second heat exchange system is used to supplement the contribution of the first heat exchange systems. Further, the solar energy system solar heat exchange system may be controlled such that a contribution of the second heat exchange system is substantially limited to enabling heating or cooling to reach the preselected or predetermined heating or cooling condition.

The first heat exchange system may also be arranged to use thermal energy form the energy storage for heating or cooling.

The solar energy system may comprise a control system that is arranged to control a cooling or heating contribution of the second heat exchange system dependent on a predetermined or preselected heating or cooling condition and/or dependent on a heating or cooling contribution of the first heat exchange system, which in turn may be dependent on external parameters such as sunlight conditions.

In one embodiment, the control system is software controlled and is programmable, for example by a user. The control system may be arranged for programming a mode of operation of the solar energy system.

In one specific embodiment the control system comprises:
a selector for selecting an operating mode or operation condition of the solar energy system, such as a temperature to which the region should be cooled or heated;
a sensor arrangement that provides information indicative of an amount of thermal energy that is provided or provideable by the solar energy collector;

and a processor that is arranged to control operation of the second heat exchange system to supplement the operation of the first heat exchange system based on a selected mode of operation or condition and based on information provided by the sensor arrangement.

The sensor arrangement may be arranged to provide the information in predetermined time intervals or substantially continuously and the processor may be arranged to control the operation of the second heat exchange system in predetermined time intervals or in substantially real time.

The solar energy system may also comprise a sensor arrangement that provides information indicative of an amount of thermal energy that is provideable by the solar energy storage. Further, the processor may be arranged to control usage of thermal energy form the energy storage for operation of the first heat exchange system.

Each of the first and second heat exchange systems may be arranged to transfer thermal energy indirectly to or from the region by exchanging heat with a hydronic circuit. The first and second heat exchange systems may comprise heat exchangers that are arranged to exchange heat with the hydronic circuit and the heat exchangers may be arranged to function as condensers when transferring thermal energy to the hydronic circuit, and to function as evaporators when transferring thermal energy from the hydronic circuit.

In accordance with a second aspect of the present invention there is provided a method of heating or cooling a region using a solar energy system, the method comprising the steps of:

obtaining energy from a solar energy source;
providing the obtained energy to a first heat exchange system, the first heat exchange system comprising an ejector that is arranged to operate using at least a portion of the obtained energy;
transferring thermal energy directly or indirectly between the first heat exchange system and a region;
determining whether there is sufficient obtained energy for use by the first heat exchange system to meet cooling or heating requirements of the region; and
if it is determined that there is insufficient obtained energy for use by the first heat exchange system to meet the cooling or heating requirements of the region:
providing energy from an energy source other than a solar energy source to a second heat exchange system that is arranged to use the provided energy to function as a heat exchange system; and
transferring thermal energy between the second heat exchange system and the region.

BRIEF DESCRIPTION OF THE DRAWINGS

In order that the present invention may be more clearly ascertained, embodiments of the present invention will now be described, by way of example only, with reference to the accompanying drawings, in which.

DESCRIPTION OF AN EMBODIMENT OF THE INVENTION

Figure 1:
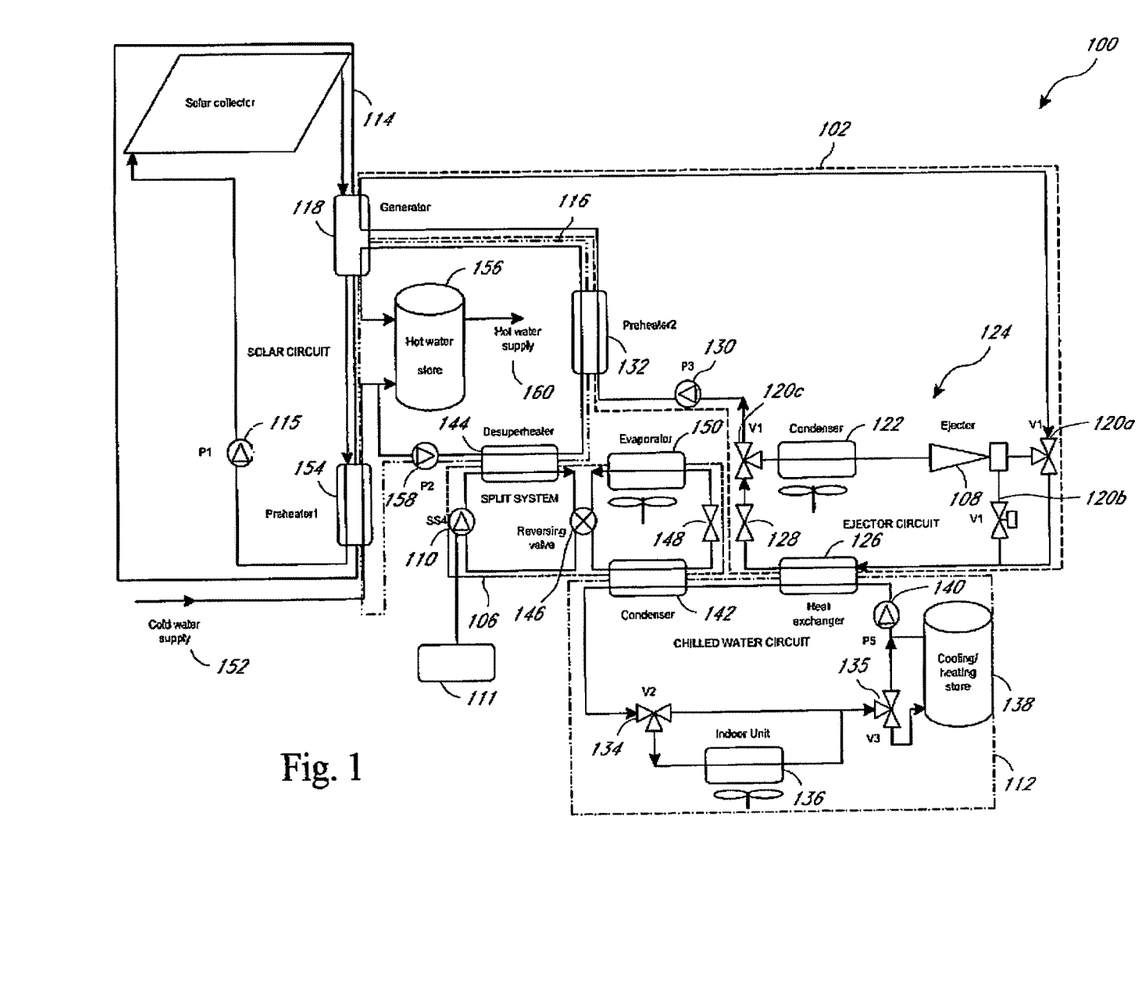
FIG. 1 is a schematic diagram showing a solar energy system in accordance with an embodiment of the present invention, the solar energy system being arranged to operate in heating mode.

FIG. 1 shows an example of a solar energy system 100 for use in heating or cooling a region in accordance with an embodiment of the present invention. The system 100 can operate in heating mode, which is described in more detail with reference to FIGS. 1 and 2, and in cooling mode, which is described in more detail with reference to FIGS. 3 and 4.

Generally, and regardless of whether the system 100 is operating in heating or cooling mode, the system 100 is arranged such that a first heat exchange system 102 of the system 100 is driven by heat energy obtained from a solar collector 104, and the first heat exchange system 102 is arranged to exchange heat in such a way so as to heat or cool the region.

If the solar collector 104 provides insufficient energy to drive the first heat exchange system 102 to meet cooling or heating demands, a second heat exchange system 106, which is powered by a conventional energy source such as mains electricity, is employed to compensate for the first heat exchange system 102. The second heat exchange system 106 is arranged to exchange heat in such a way so as to cool or heat the region to supplement the operation of the first heat exchange system 102 if required.

In this embodiment the system 100 is arranged such that a maximum amount of cooling or heating of the region is provided by the first heat exchange system 102, and wherein the second heating system 106 is used to supplement the first heat exchange system 102 if required.

The system 100 may comprise a control system (not shown) that is arranged to vary the contribution that the second heat exchange system 106 makes to cooling or heating the region with temperature and/or an amount of available solar energy. The control system is software controlled and can be programmed to increase a contribution of the second heat exchange system 106 to cooling or heating the region when for example when solar conditions change or a heating or cooling demand changes (for example as selected by an operator) and the first heat exchange system 102 is unable to provide the required cooling or heating. Additionally or alternatively the control system can be arranged to use thermal energy stored in an energy storage of the solar energy system (such as an energy storage of thermal energy in which thermal energy is stored when the solar collector of the first heat exchange system provide an excess of thermal energy) and only of the energy form the energy storage is insufficient or below a threshold limit, then the control system may activate the second heat exchange system to supplement the operation of the system 100.

In the particular example illustrated in FIG. 1, the first heat exchange system 102 comprises an ejector 108. The ejector 108 functions as a compressor when supplied with thermal energy from the solar collector 104 or heat recovered from the second heat exchange system 106. The ejector 108 predominantly uses beat energy obtained from solar energy. This is in contrast to a conventional compressor, such as an electrically powered compressor 110 used in the second heat exchange system 106, wherein the compressor is driven by a conventional source of energy 111 such as mains electricity.

Arranging the system 100 so as to maximise the amount of cooling or heating of the region by the first heat exchange system 102 provides the advantage of maximising an amount of renewable energy used in the cooling or heating of the region. In situations in which there is an insufficient amount of solar energy to provide the required cooling or heating, the conventionally powered second heat exchange system 106 is used to contribute in two ways. Firstly, system 106 provides additional cooling or heating to the region and, secondly, system 106 provides heat to system 102 through heat exchangers 144 and 132 to supplement the solar heat. The second heat exchange system may provide the total required cooling or heating if necessary.

Operation of the system 100 in heating mode will now be described in more detail with reference to FIGS. 1 and 2.

In addition to the first and second heat exchange systems 102, 106, the system 100 also comprises a hydronic circuit 112, which is arranged to exchange heat with the first and second heat exchange systems 102, 106 for use in supplying cooling or heating to the region. The system 100 also comprises a solar circuit 114 and a solar hot water system 116, the solar circuit 114 being arranged to supply heat energy obtained from the solar collector 104 to the first heat exchange system 102 and to the solar hot water system 116.

The system 100 is arranged to transfer heat energy via appropriate fluids. For example, the first and second heat exchange systems 102, 106 utilise refrigerants for heat transfer, and the hydronic circuit 112, solar circuit 114 and the solar hot water system 116 utilise water for heat transfer (and for supplying hot water in the case of the solar hot water system 116).

In heating mode, the solar circuit 114 will transfer heat energy from the solar collector 104 to the first heat exchange system 102 via a vapour generator (heat exchanger) 118. Additional heat energy from the solar collector 104 is provided to the solar hot water system 116 via the vapour generator 118. Typically, the solar collector 104 is of sufficient size such that heat energy can be provided to the solar hot water system 116 regardless of whether or not the ejector 108 is operating.

It will be appreciated that the solar collector 104 is oversized for a conventional solar water heating type application, in this example by a factor of four, to enable the solar collector 104 to obtain sufficient energy to operate the ejector 108. As such, the solar collector 104 will be able to supply a relatively high proportion of a hot water load. Typically, the solar collector 104 is arranged to supply hot water at approximately 100° C. for heat exchange with the first heat exchange system 102. Water will typically be at a temperature of approximately 70° C. after transferring heat to the first heat exchange system 102 via the generator 118. The temperature of approximately 70° C. is suitable for heat exchange with the solar hot water system 116, also via the generator 118.

The water of the solar circuit 114 is pumped around the solar circuit 114 by a solar collector circulation pump 115, also marked as pump P1 in FIG. 1.

A bypass valve system V1, comprising valves 120a, 120b and 120c as shown in FIG. 1, is arranged (i.e., the bypass valve system V1 is enabled) such that heat energy supplied by the solar circuit 114 bypasses the ejector 108 and a condenser 122 of an ejector circuit 124. The heat energy flows through a heat exchanger 126 which, when the system 100 is operating in heating mode, functions as a liquid to liquid heat exchanger so as to transfer heat from the first heat exchange system 102 to the hydronic circuit 112.

Having supplied at least some heat energy to the hydronic circuit 112, the cooled refrigerant will flow through an open expansion valve 128 of the ejector circuit 124 and through the valve 120c to be pumped by ejector pressure pump 130, also marked as pump P3 in FIG. 1.

The refrigerant will then flow through a preheater 132 that is arranged to heat the refrigerant using heat from the hot water supply system 116 in certain circumstances, such as when heat produced by the second heat exchange system 106 is recovered by the hot water supply system 116 via a desuperheater. The refrigerant then returns to the generator 118 where it is further heated by the solar circuit 114 and the cycle of the refrigerant transferring heat through the first heat exchange system 102 begins again.

As mentioned earlier, the first heat exchange system 102 transfers heat to the hydronic circuit 112 via the heat exchanger 126, functioning in this instance as a conventional liquid to liquid heat exchanger, that transfers heat from the first heat exchange system 102 to the hydronic circuit 112. The transferred heat will heat the water in the hydronic circuit 112, which then flows through a hydronic circuit heat exchanger bypass valve 134, also marked as valve V2 in FIG. 1, which is arranged (i.e., the bypass valve 134 is disabled to direct the heated water to a heat exchanger 136 for use in providing heat to the region. In this example, the heat exchanger 136 is an indoor heat exchange unit that is used to provide heat to the region.

The water, having provided at least some heat to the heat exchanger 136 for heating the region, then flows through a cooling/heating store 138 then flows either directly to heat exchanger 126 or, if bypass valve 135 is enabled, to the storage 138 where additional heat can be stored. In either case water may flow to a hydronic circuit pump 140, also marked as pump P5 in FIG. 1, and the water is pumped through the heat exchanger 126 where heat is transferred from the first heat exchange system 102 to the hydronic circuit 112 and the cycle of transferring heat through the hydronic circuit 112 begins again.

If the system 100 is not supplying sufficient heat to the hydronic circuit 112 for use by the heat exchanger 136 to heat the region, then the system 100 is arranged to provide power to the second heat exchange system 106. In this example, the second heat exchange system 106 is a reverse cycle split system that can operate in a heating mode or in a cooling mode and comprises a heat exchanger 142 that is arranged to transfer heat between the second heat exchange system 106 and the hydronic circuit 112. In this example, the second heat exchange system 106 is operating in heating mode, and the heat exchanger 142 functions as a condenser so as to transfer heat from the second heat exchange system 106 to the hydronic circuit 112.

The compressor 110 of the second heat exchange system 106 is arranged to receive power from a source other than the solar collector 104. In this particular example, the compressor 110 is an electric compressor that is arranged to receive power from mains electricity 111. The compressor 110 compresses the refrigerant, which will be a vapour at this stage. The pressurized refrigerant then flows through a desuperheater 144 where excess heat can be transferred from the refrigerant to the hot water supply system 116, and then to the heat exchanger 142 via a reversing valve 146.

It will be appreciated that, although the desuperheater 144 can be used to transfer excess heat from the refrigerant to the hot water supply system 116, in heating mode it is preferable to direct heat from compressor via the desuperheat 144 to the heat exchanger 142. Typically, excess heat is transferred to the hot water supply system 116 via the desuperheater 144 when the system is operating in cooling mode, which is described later with reference to FIGS. 3 and 4.

The refrigerant condenses into a liquid in the heat exchanger 142, and heat is transferred from the heat exchanger 142 to the water flowing through the hydronic circuit 112 for use by the heat exchanger 136 to provide heat to the region.

The refrigerant, having transferred at least some heat to the hydronic circuit 112, then flows through an expansion valve 148 which lowers a pressure of the refrigerant. The refrigerant then flows through heat exchanger 150, functioning as an evaporator in this mode, which transfers heat to the refrigerant so as to vaporise and heat the refrigerant using heat from outside the region. The refrigerant then flows back to the compressor 110 for compression and the cycle of transferring heat to the hydronic circuit 112 begins again.

The system 100 is also arranged, if required (for example if heating demands are not met by the first heat exchange system 102), to transfer heat from the cooling/heating store 138 for use in the hydronic circuit so as to provide heat to the heat exchanger 136.

The system 100 is also arranged to provide solar hot water via the solar hot water system 116. The solar hot water system 116 receives water from a cold water supply 152. The water flows through a preheater 154 which is arranged to transfer heat from the solar circuit 114 to preheat the water. The water then delivers at least some heat to a hot water store 156, which in this example is a water tank arranged to store hot water. Water is then pumped by a hot water circulation pump 158, also marked as pump P2 in FIG. 1, through the desuperheater 144, where, if available, excess heat from the second heat exchange system 106 is transferred to the water. The water then flows through the preheater 132 where heat is transferred from the water to the refrigerant of the first heat exchange system 102 so as to preheat the refrigerant. The water then passes through the generator 118 where heat is transferred from the solar circuit 114 to the water. The heated water then flows to the hot water store 156 where the hot water is stored for use by a hot water supply 160.

The system 100 is arranged to control, for example via a control module (not shown), an amount of heat transferred from the first heat exchange system 102, the second heat exchange system 106 and the cooling/heating store 138 for use in heating the region. An example control scheme is illustrated in FIG. 2 and will now be described in more detail.

Figure 2:
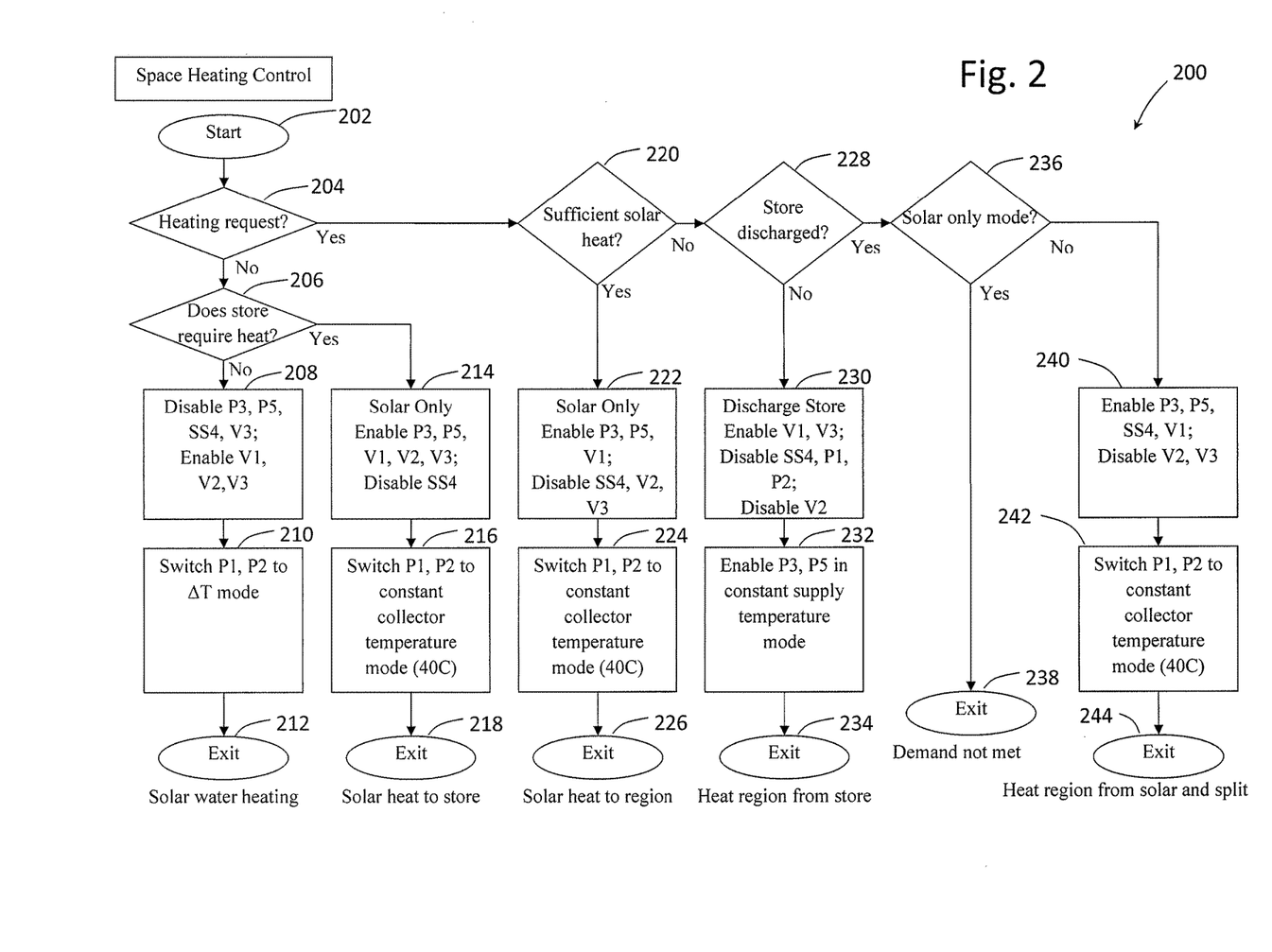
FIG. 2 is a flow chart showing a control scheme for operating the solar energy system of FIG. 1 in heating mode.

FIG. 2 shows a control scheme 200 for controlling the system 100 in heating mode. In a first step 202, the system 100 is started, for example by a user pressing an 'on' switch or similar and selecting that the system 100 operate in 'heating mode'.

The system 100 determines in step 204 whether a request to heat the region has been made. The heating request can be made, for example, by a user interacting with a control panel or remote control associated with the system 100.

If the system 100 determines that a heating request has not been made, the system 100 determines (step 206) whether the cooling/heating store 138 requires heat. Determining whether the cooling/heating store 138 requires heat may comprise checking information from a thermostat or temperature profile sensor (not shown) associated with the cooling/heating store 138.

For example, a material used as a thermal store in the cooling/heating store 138 may store heat through sensible heating of water. If a temperature of 40° C. of the material used in the cooling/heating store 138 is suitable for hydronic heating, then the system 100 will determine 206 that the cooling/heating store 138 requires heat if the information from the thermostat or temperature profile sensor indicates that the temperature of the cooling/heating store 138 is below 40° C. Similarly, if a temperature of 70° C. of the material used in the cooling/heating store 138 is suitable for providing sufficient heat energy for radiators or fan/coil units, then the system 100 will determine 206 that the cooling/heating store 138 requires heat if the information from the thermostat or temperature profile sensor indicates that the temperature of the cooling/heating store 138 is below 70° C.

It will be appreciated that the material used as a thermal store in the cooling/heating store 138 may be a phase change material, in which case heat is stored and released at constant temperature and so alternative measures of determining a heat content of the cooling/heating store 138 may be used.

If the system determines in step 206 that the cooling/heating store 138 does not require heat, the system 100 performs step 208 of disabling the ejector pressure pump 130 (pump P3), the hydronic circuit pump 140 (pump P5) and the compressor 110 (split system SS4) and bypass valve 135 (V3). In step 208, the system 100 enables bypass valves 120*a*, 120*b*, 120*c* (bypass valve system V1) bypass valve 134 (bypass valve V2).

In step 210, the system 100 switches the solar collector circulation pump 115 (pump P1) and the hot water circulation pump 158 (pump P2) to a ΔT mode, that is, a mode in which the solar collector circulation pump 115 (pump P1) is switched on when a temperature of an output of the solar collector 104 exceeds a temperate of water at a bottom of the tank of the hot water store 156 by a first predefined amount, such as 7° C., and that switches off when the difference between the temperature of the output of the solar collector 104 and the temperature of water at the bottom of the tank of the hot water store 156 is reduced to a second predefined amount, such as 2° C. In this way, heat is transferred from the solar circuit 114 to the hot water supply system 116 so as to maximise solar heating of the water of the hot water supply system 116.

Steps 208 and 210 therefore effectively disable the first and second heat exchange systems 102, 106, bypass the heat exchanger 136, and result in heat being transferred from the solar circuit 114 to the hot water supply system 116.

After performing steps 208 and 210, the system 100 exits 212 from the current control path and returns to step 204 to determine whether a heating request has been made.

If the system determines in step 206 that the cooling/heating store 138 requires heat, the system 100 performs step 214 of enabling the ejector pressure pump 130 (pump P3), the hydronic circuit pump 140 (pump P5), bypass valves 120*a*, 120*b*, 120*c* (bypass valve system V1), bypass valve 134 (V2) and bypass valve 135 (V3). In step 214, the system 100 also disables the compressor 110 (split system SS4)). In step 216, the system 100 switches the solar collector circulation pump 115 (pump P1) and the hot water circulation pump 158 (pump P2) to a constant collector temperature mode, that is, a mode in which a speed of the solar collector circulation pump 115 (pump P1) is adjusted such that the solar circuit 114 attempts to produce a constant solar collector 104 output temperature for ultimate transfer to the region via the heat exchanger 136. For heating purposes, this temperature might be 40° C. or higher. It will be appreciated that the hot water supply system 116 may or may not be operating, and therefore the hot water circulation pump 158 (pump p2) may or not be operating.

Steps 214 and 216 have the effect of transferring heat from the solar circuit 114 to the first heat exchange system 102, and then from the first heat exchange system to the cooling/heating source 138 for later use. The second heat exchange system 106 is effectively disabled, which will reduce mains electricity usage. Further, the heat exchanger 136 is bypassed, and the amount of heat ultimately transferred from the solar circuit 114 to the cooling/heating store 138 is maximised as the solar collector circulation pump 115 (pump P1) is operating in the constant collector temperature mode, along with the hot water circulation pump 158 (pump P2), if applicable.

After performing steps 214 and 216, the system 100 exits (step 218) from the current control path and may return to step 204 to determine whether a heating request has been made.

If the system 100 determines that a heating request has been made, the system 100 determines in step 220 whether there is sufficient solar heat to fulfil the heating request. Determining whether there is sufficient solar heat to fulfil the heating request may comprise checking operating temperature information associated with the solar circuit 114. For example, the solar collector circulation pump 115 (pump P1) can be activated and a temperature of the fluid exiting the solar collector 104 checked (after a small delay) such that the solar collector 104 power may be measured by the system 100. If it is determined that insufficient temperature is available, then the solar collector circulation pump 115 (pump P1) is de-activated and the system 100 moves on to step 228 (described later).

If the system determines in step 220 that there is sufficient solar heat to fulfil the heating request, the system 100 performs step 222 of enabling the ejector pressure pump 130 (pump P3), the hydronic circuit pump 140 (pump P5), bypass valves 120a, 120b, 120c (bypass valve system V1). In step 222, the system also disables the bypass valve 134 (bypass valve V2), the bypass valve 135 (V3) and the compressor 110 (split system SS4). In step 224, the system 100 switches the solar collector circulation pump 115 (pump P1) and the hot water circulation pump 158 (pump P2) to constant collector temperature mode. Again, it will be appreciated that the hot water circulation pump 158 (pump P2) may not be operating if the hot water supply system 116 is not operating.

Steps 222 and 224 have the effect of transferring heat from the solar circuit 114 to the first heat exchange system 102, and then from the first heat exchange system to the heat exchanger 136 for use in heating the region. The second heat exchange system 106 is effectively disabled, which will reduce mains electricity usage. Further, the heat exchanger 136 is not bypassed, and the amount of heat ultimately transferred from the solar circuit 114 to the heat exchanger 136 for use in heating the region is maximised as the solar collector and hot water circulation pumps 115, 158 (pumps P1 and P2) are operating in the constant collector temperature mode.

After performing steps 222 and 224, the system 100 exits 218 from the current control path and may return to step 204 to determine whether a heating request has been made.

If the system determines in step 220 that there is insufficient solar heat to fulfil the heating request, the system 100 performs step 228 of determining whether heat stored in the cooling/heating store 138 has been discharged. Step 228 may comprise checking a temperature associated with the cooling/heating store 138 to determine whether there is any heat that can be discharged therefrom.

If it is determined 228 that heat stored in the cooling/ heating store 138 has not been discharged, then the system 100 performs step 230 of enabling the bypass valves 120a, 120b, 120c (bypass valve system V1) and disabling the compressor 110 (split system SS4), the solar collector circulation pump 115 (pump P1), the hot water circulation pump 158 (pump P2), bypass valve 134 (bypass valve V2) and bypass valve 135 (V3). In step 232, the system 100 enables the ejector pressure pump 130 (pump P3) and the hydronic circuit pump 140 (pump P5) to function in a constant supply temperature mode, that is, a mode in which the first heat exchange system 102 supplies some heat to meet the load, and in which the shortfall of heat supplied by the first heat exchange system 102 is met by heat supplied from the cooling/heating store 138. If it is desired that the cooling/heating store 138 supply all of its heat to meet the load, then the ejector pressure pump 130 (pump P3) can be deactivated.

Steps 230 and 232 have the effect of transferring heat from the cooling/heating store 138 to the heat exchanger 136 for use in heating the region. The second heat exchange system 106 is effectively disabled, which will reduce mains electricity usage.

After performing steps 230 and 232, the system 100 exits 234 from the current control path and may return to step 204 to determine whether a heating request has been made.

If it is determined in step 228 that heat stored in the cooling/heating store 138 has been discharged, then the system 100 determines (step 236) whether the system 100 has been instructed, for example by a user of the system 100, to operate in 'solar only' mode, meaning that the system 100 does not obtain any additional power from mains electricity or other non-solar energy sources. If it is determined in step 236 that the system 100 is operating in 'solar only' mode, then the system 100 will not meet the heating requirements and the system 100 exits (step 238) from the current control path and may return to step 204 to determine whether a heating request has been made.

If it is determined in step 236 that the system 100 is not operating in 'solar only' mode, then the system 100 performs step 240 of enabling the ejector pressure pump 130 (pump P3), the hydronic circuit pump 140 (pump P5), the compressor 110 (split system SS4), the bypass valves 120a, 120b, 120c (bypass valve system V1) and disabling bypass valve 135 (V3). In step 240, the system 100 also disables the bypass valve 134 (bypass valve V2).

In step 242, the system 100 switches the solar collector circulation pump 115 (pump P1) and the hot water circulation pump 158 (pump P2) to the constant collector temperature mode, although it will be appreciated that the hot water circulation pump 158 (pump P2) may not be operating if the hot water supply system 116 is not operating.

Steps 240 and 242 have the effect of transferring heat from the solar circuit 114 to the first heat exchange system 102, and then from the first heat exchange system to the heat exchanger 136 for use in heating the region. The second heat exchange system 106 is enabled such that additional heat is transferred from the second heat exchange system 106 to the heat exchanger 136. The amount of heat ultimately transferred from the solar circuit 114 to the heat exchanger 136 for use in heating the region is maximised as the solar collector and hot water circulation pumps 115, 158 (pumps P1 and P2) are operating in the constant collector temperature mode. However, as this amount does not meet demand, the second heat exchange system 106, which is powered by mains electricity, supplies additional heat to the heat exchanger 136 to compensate for the first heat exchange system 102.

After performing steps 240 and 242, the system 100 exits 244 from the current control path and may return to step 204 to determine whether a heating request has been made.

Figure 3:
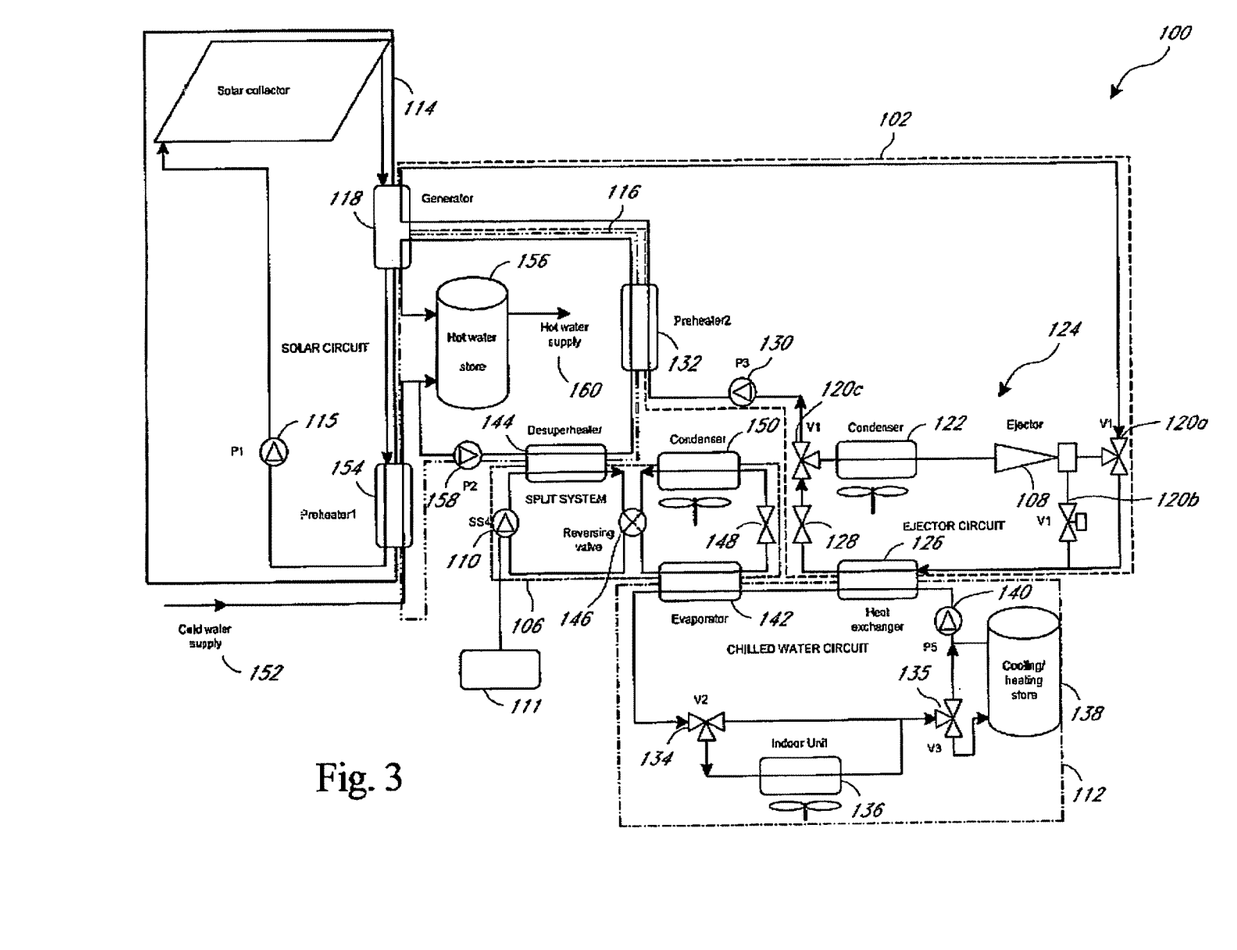
FIG. 3 is a schematic diagram showing the solar energy system of FIG. 1 operating in cooling mode.

Operation of the system 100 in cooling mode will now be described in more detail with reference to FIGS. 3 and 4. In cooling mode, the solar circuit 114 transfers heat energy from the solar collector 104 to the first heat exchange system 102 via the generator 118. The bypass valves 120a, 120b and 120c (bypass valve system V1) are arranged (i.e., the bypass valve system V1 is disabled) such that heat energy obtained from the solar circuit 114 is supplied to the ejector 108. The ejector 108, using the heat energy, functions as a compressor to pressurise the refrigerant (which will be a vapour at this stage). The refrigerant then flows to the condenser 122 where the refrigerant is cooled to a high pressure, moderate temperature liquid. The refrigerant is then directed by valve 120c to the expansion valve 128 where the pressure of the refrigerant is reduced. The refrigerant then flows through the heat exchanger 126, which functions as an evaporator so as to absorb heat from the hydronic circuit 112 (bypass valve 135 (V3) is disabled), effectively cooling the water in the hydronic circuit 112 and heating the refrigerant of the ejector circuit 124 to a heated vapour. The refrigerant then returns to the ejector 108 where the heated vapour is compressed and the cycle repeats.

In this way, the first heat exchange system is extracting heat from the hydronic circuit 112, therefore transferring coolth to the hydronic circuit 112 that can be used by the heat exchanger 136 to cool the region.

At least a portion of the refrigerant will be pumped by the ejector pressure pump 130 through the preheater 132 to obtain heat from either the second heat exchange system 106 or the hot water supply system 116, and then to the generator 118 where the refrigerant is heated by the solar circuit 114 again and the cycle of the refrigerant transferring heat through the first heat exchange system 102 begins again.

As mentioned earlier, the first heat exchange system 102 transfers coolth to the hydronic circuit 112 via the heat exchanger 126, functioning in this instance as an evaporator so as to transfer heat from the hydronic circuit 112 to the first heat exchange system 102. The heat transfer will cool the water in the hydronic circuit 112 (bypass valve 135 (V3) is disabled), which then flows through the hydronic circuit heat exchanger bypass valve 134 (valve V2) which is arranged (i.e., the bypass valve 134 is disabled) to direct the cooled water to the heat exchanger 136 for use in cooling the region.

The water, having provided at least some coolth to the indoor unit 136, then flows through a cooling/heating store 138 where additional coolth can be stored if bypass valve 135 (V3) is enabled. Water may then flow to the hydronic circuit pump 140 and the water is pumped through the heat exchanger 126 where heat is transferred from the hydronic circuit 112 to the first heat exchange system 102 and the cycle of transferring coolth through the hydronic circuit 112 begins again.

If the system 100 is not supplying enough coolth to the hydronic circuit 112 for use by the heat exchanger 136 to cool the region, the system 100 is arranged to provide power to the second heat exchange system 106 when operating in cooling mode wherein the heat exchanger 142 functions as an evaporator so as to transfer heat from the hydronic circuit 112 to the refrigerant of the second heat exchange system 106.

The compressor 110 of the second heat exchange system 106 receives power from mains electricity and compresses the refrigerant. The heated, compressed refrigerant then flows through a desuperheater 144 where excess heat is transferred from the refrigerant to the hot water supply system 116, and then to the heat exchanger 150, functioning in this mode as a condenser, via the reversing valve 146. The refrigerant is condensed in the heat exchanger 150 to a cooler liquid.

The refrigerant, having been cooled by the condensing action of the heat exchanger 150, then flows through the expansion valve 148, lowering the pressure of the refrigerant. The refrigerant then flows through the heat exchanger 142, functioning as an evaporator in this mode, which vaporises the refrigerant by transferring heat from the hydronic circuit 112 to the refrigerant. Vaporising the refrigerant cools the water of the hydronic circuit 112, and the heated, vaporised refrigerant flows back to the compressor 110 and the cycle of transferring coolth to the hydronic circuit 112 begins again.

The system 100 is also arranged, if required (for example if cooling demands are not met by the first heat exchange system 102), to transfer heat from the cooling/heating store 138 for use in the hydronic circuit 112 for use in cooling the region by the heat exchanger 136.

The system 100 is also arranged to provide solar hot water via the hot water system 116 when the system 100 is operating in cooling mode in the same manner as when the system 100 operates in heating mode.

Similar to when operating in heating mode, the system 100 is arranged to control an amount of coolth transferred from the first heat exchange system 102, the second heat exchange system 106 and the cooling/heating store 138 for use in cooling the region. An example control scheme is illustrated in FIG. 4 and will now be described in more detail.

Figure 4:
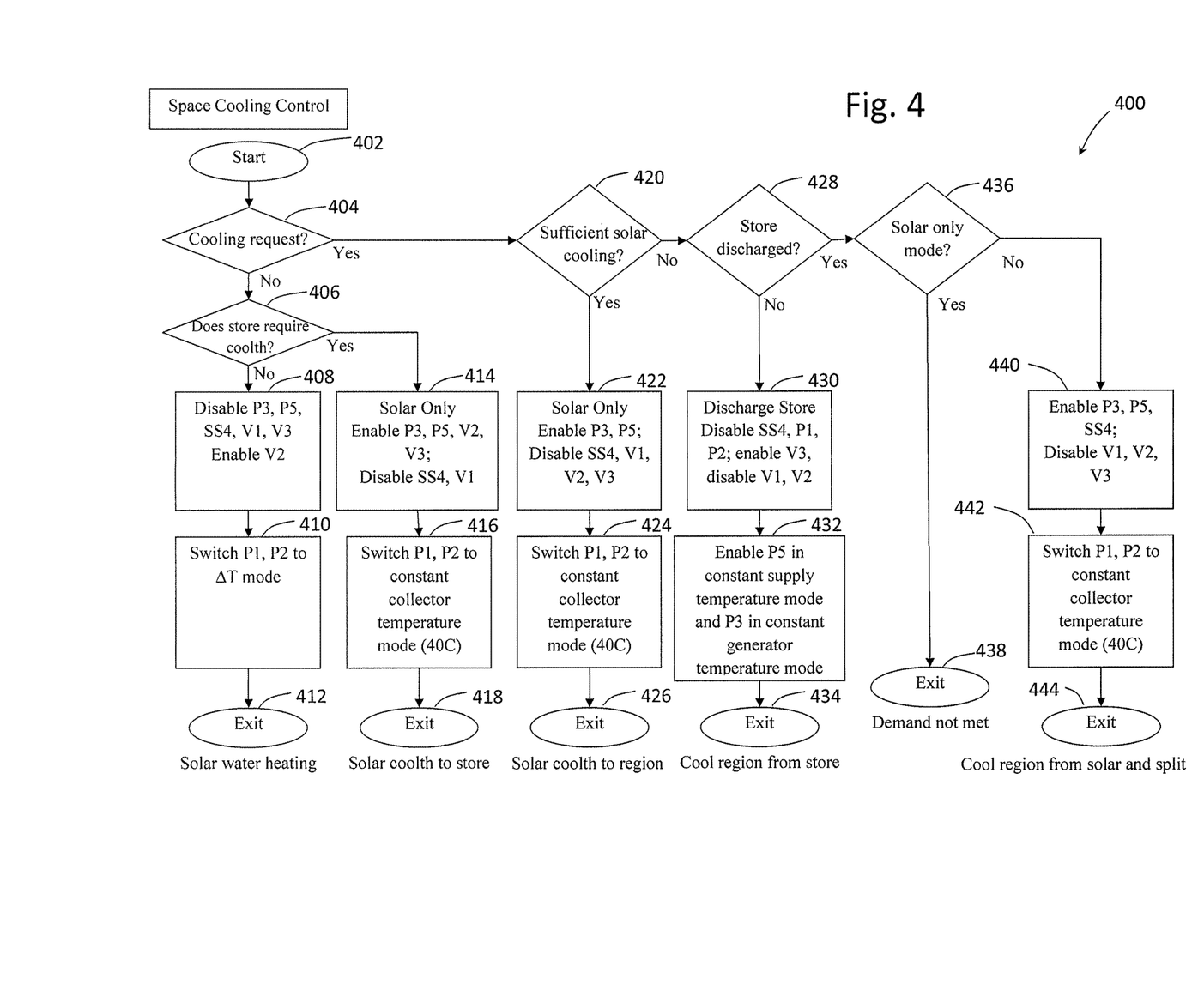
FIG. 4 is a flow chart showing a control scheme for operating the solar energy system of FIG. 3 in cooling mode.

FIG. 4 shows a control scheme 400 for controlling the system 100 in cooling mode. In a first step 402, the system 100 is started, for example by a user pressing an 'on' switch and selecting that the system 100 operate in 'cooling mode'.

The system 100 determines 404 whether a request to cool the region has been made. The cooling request can be made in a similar manner to making a heating request, that is, by interacting with a control panel or remote control associated with the system 100.

If the system 100 determines that a cooling request has not been made, the system 100 determines 406 whether the cooling/heating store 138 requires coolth. Determining 406 whether the cooling/heating store 138 requires coolth may comprise checking information from the thermostat associated with the cooling/heating store 138. For example, if the material used as a thermal store in the cooling/heating store 138 stores coolth through sensible cooling of water, then the system 100 will determine 406 that the cooling/heating store 138 requires coolth if the information from the thermostat or temperature profile sensor indicates that the temperature of the cooling/heating store 138 is above, for example, 12° C. Once again, it will be appreciated that the material used as a thermal store in the cooling/heating store 138 may be a phase change material, in which case coolth is stored and released at constant temperature and so an alternative method of determining a coolth content of the cooling/heating store 138 may be used.

If the system determines in step 406 that the cooling/heating store 138 does not require coolth, the system 100 performs step 408 of disabling the ejector pressure pump 130 (pump P3), the hydronic circuit pump 140 (pump P5), the compressor 110 (split system SS4), and the bypass valves 120a, 120b, 120c (bypass valve system V1) bypass valve 135 (V3). The bypass valve 134 (bypass valve V2) is enabled. In step 410, the system 100 switches the solar collector circulation pump 115 (pump P1) and the hot water circulation pump 158 (pump P2) to ΔT mode.

Steps 408 and 410 therefore effectively disable the first and second heat exchange systems 102, 106, bypass the heat exchanger 136, and result in heat being transferred from the solar circuit 114 to the hot water supply system 116.

After performing steps 408 and 410, the system 100 exits 412 from the current control path and returns to step 404 to determine whether a cooling request has been made.

If the system determines in step 406 that the cooling/heating store 138 requires coolth, the system 100 performs step 414 of enabling the ejector pressure pump 130 (pump P3), the hydronic circuit pump 140 (pump P5), and bypass valve 134 (bypass valve V2). In step 414, the system 100 also disables the compressor 110 (split system SS4), the bypass valves 120a, 120b, 120c (bypass valve system V1) and enables bypass valve V3. In step 416, the system 100 switches the solar collector circulation pump 115 (pump P1) and the hot water circulation pump 158 (pump P2) to constant collector temperature mode. As with the heating mode, it will be appreciated that the hot water circulation pump 158 (pump P2) may not operate if the hot water system 116 is not operating.

Steps 414 and 416 have the effect of transferring heat from the solar circuit 114 to the first heat exchange system 102, and then of transferring coolth from the first heat exchange system to the cooling/heating source 138 for later use. The second heat exchange system 106 is effectively disabled, which will reduce mains electricity usage. Further, the heat exchanger 136 is bypassed, and the amount of coolth ultimately transferred from the solar circuit 114 to the cooling/heating store 138 is maximised as the solar collector and hot water circulation pumps 115, 158 (pumps P1 and P2) are operating in the constant collector temperature mode.

After performing steps 414 and 416, the system 100 exits 418 from the current control path and may return to step 404 to determine whether a cooling request has been made.

If the system 100 determines that a cooling request has been made, the system 100 determines 420 whether there is sufficient solar heat to fulfil the cooling request. Determining 420 whether there is sufficient solar heat to fulfil the cooling request may comprise checking operating temperature information associated with the solar circuit 114.

If the system determines step 420 that there is sufficient solar heat to fulfil the cooling request, the system 100 performs step 422 of enabling the ejector pressure pump 130 (pump P3), the hydronic circuit pump 140 (pump P5). In step 422, the system also disables the bypass valves 120a, 120b, 120c (bypass valve system V1), the bypass valve 134 (bypass valve V2) the compressor 110 (split system SS4) and bypass valve 135 (V3). In step 424, the system 100 switches the solar collector circulation pump 115 (pump P1) and the hot water circulation pump 158 (pump P2) to constant collector temperature mode, although it will be appreciated that the hot water circulation pump 158 (pump P2) may not operate if the hot water system 116 is not operating.

Steps 422 and 424 have the effect of transferring heat from the solar circuit 114 to the first heat exchange system 102, and then transferring coolth from the first heat exchange system to the heat exchanger 136 for use in cooling the region. The second heat exchange system 106 is effectively disabled, which will reduce mains electricity usage. Further, the heat exchanger 136 is not bypassed, and the amount of coolth ultimately transferred from the solar circuit 114 to the heat exchanger 136 is maximised as the solar collector and hot water circulation pumps 115, 158 (pumps P1 and P2) are operating in the constant collector temperature mode.

After performing steps 422 and 424, the system 100 exits 418 from the current control path and may return to step 404 to determine whether a cooling request has been made.

If the system determines in step 420 that there is insufficient solar heat to fulfil the cooling request, the system 100 performs step 428 of determining whether coolth stored in the cooling/heating store 138 has been discharged. The step 428 may comprise checking a temperature associated with the cooling/heating store 138 to determine whether there is any coolth that can be discharged therefrom. For example, the step 428 may comprise checking a temperature profile of the tank, or at least a temperature of a top of the tank, of the cooling/heating store 138 and, if the temperature profile is uniformly below a predetermined temperature such as 12° C., the system 100 determines that the coolth stored in the cooling/heating store 138 has not been discharged.

If it is determined in step 428 that coolth stored in the cooling/heating store 138 has not been discharged, then the system 100 performs step 430 of disabling the compressor 110 (split system SS4), the hot water circulation pump 158 (pump P2), the bypass valves 120a, 120b, 120c (bypass valve system V1), the bypass valve 134 (bypass valve V2). Further, the system enables bypass valve 135 (V3). The solar collector circulation pump 115 (pump P1) may be disabled, however as explained below, there are circumstances under which the solar collector circulation pump 115 may operate. In step 432, the system 100 enables the ejector pressure pump 130 (pump P3) to operate in the constant supply temperature mode, and the hydronic circuit pump 140 (pump P5) to operate in a constant generator temperature mode. It will be appreciated that the first heat exchange system 102 may still function to supply part cooling load via the heat exchanger 126. Therefore, the pumps 115, 130 and 140 (i.e., pumps P1, P3 and P5) can be activated unless the solar collector 104 has insufficient temperature or power to drive the first heat exchange system 102.

Steps 430 and 432 have the effect of transferring coolth from the cooling/heating store 138 to the heat exchanger 136 for use in cooling the region. The second heat exchange system 106 is effectively disabled, which will reduce mains electricity usage.

After performing steps 430 and 432, the system 100 exits 434 from the current control path and may return to step 404 to determine whether a cooling request has been made.

If it is determined in step 428 that coolth stored in the cooling/heating store 138 has been discharged, then the system 100 determines 436 whether the system 100 has been instructed, for example by a user of the system 100, to operate in 'solar only' mode, meaning that the system 100 does not obtain any additional power from mains electricity or other non-solar energy sources. If it is determined 436 that the system 100 is operating in 'solar only' mode, then the system 100 will not meet the cooling requirements and the system 100 exits 438 from the current control path and may return to step 404 to determine whether a cooling request has been made.

If it is determined in step 436 that the system 100 is not operating in 'solar only' mode, then the system 100 performs step 440 of enabling the ejector pressure pump 130 (pump P3), the hydronic circuit pump 140 (pump P5), the compressor 110 (split system SS4). In step 440, the system 100 also disables the bypass valves 120a, 120b, 120c (bypass valve system V1), the bypass valve 134 (bypass valve V2) and the bypass valve 135 (V3).

In step 442, the system 100 switches the solar collector circulation pump 115 (pump P1) to a constant collector temperature mode, and the hot water circulation pump 158 (pump P2) operates when the first and second heat exchange systems 102, 106 operate together. In this way, the hot water supply system 116 can deliver heat to the hot water store 156 via the generator 118, if desired.

Steps 440 and 442 have the effect of transferring heat from the solar circuit 114 to the first heat exchange system 102, and then of transferring coolth from the first heat exchange system to the heat exchanger 136 for use in cooling the region. The second heat exchange system 106 is enabled such that additional coolth is transferred from the second heat exchange system 106 to the heat exchanger 136. The amount of coolth ultimately transferred from the solar circuit 114 to the heat exchanger 136 is maximised as the solar collector circulation pump 115 (pump P1) is operating in constant collector temperature mode. However, as this amount does not meet demand, the second heat exchange system 106, which is powered by mains electricity, supplies additional coolth to compensate for the first heat exchange system 102, with the hot water circulation pump 158 (pump P2) operating when the first and second heat exchange systems 102, 106 are working together.

After performing steps 440 and 442, the system 100 exits 444 from the current control path and may return to step 404 to determine whether a cooling request has been made. Modifications and variations as would be apparent to a skilled addressee are determined to be within the scope of the present invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A solar energy system comprising:
   a solar collector in a first circuit for providing energy generated from incident solar radiation;
   a first heat exchange system comprising a second circuit including an ejector that is arranged to operate using at least a portion of the energy provided by the solar energy collector; and
   a second heat exchange system comprising a third circuit, wherein the second heat exchange system is arranged to operate using energy from an energy source other than a solar energy source;
   a control system comprising:
     a selector for selecting an operating mode or operation condition of the solar energy system;
     at least one sensor that provides information indicative of an amount of thermal energy that is provided or provideable by the solar energy collector; and
     a processor arranged to control operation of the second heat exchange system to supplement the operation of the first heat exchange system based on a selected mode of operation or condition and based on information provided by the at least one sensor; and
   a hydronic circuit arranged to exchange thermal energy with the first and second heat exchange systems and comprising a region heat exchanger to supply cooling or heating to a region;
   wherein the solar energy system further comprises a first heat exchanger arranged to directly transfer thermal energy between the first heat exchange system and the hydronic circuit and a second heat exchanger arranged to directly transfer thermal energy between the second heat exchange system and the hydronic circuit, wherein the solar energy system is arranged such that the first heat exchange system and the second heat exchange system are capable of simultaneously transferring thermal energy between the respective first or second heat exchange system and the hydronic circuit via the first and second heat exchangers, respectively;
   wherein the solar energy system is arranged to control a relative contribution of thermal energy to or from of the first and second heat exchange systems to the hydronic circuit and the region.

2. The solar energy system of claim 1 wherein the solar energy system is arranged such that the second heat exchange system supplements the operation of the first heat exchange system when the contribution of the first heat exchange system to the transfer of thermal energy is insufficient for an operation condition of the solar energy system.

3. The solar energy system of claim 1 wherein the first heat exchange system is arranged such that an operation mode of the first heat exchange system is selectable between a first mode for heating the region and a second mode for cooling the region.

4. The solar energy system of claim 3 wherein the first heat exchange system comprises an ejector circuit and is arranged for bypassing at least a portion of the ejector circuit in the first mode of operation and is arranged such that the portion of the ejector circuit is not bypassed in the second mode of operation.

5. The solar energy system of claim 1 wherein the second heat exchange system is arranged for operation using electrical energy and comprises an electrical compressor.

6. The solar energy system of claim 1 the second heat exchange system is arranged for selecting between a first mode for heating the region and a second mode for cooling the region.

7. The solar energy system of claim 1 further comprising a water heating system for heating water and being arranged to transfer heat to the water heating system from the energy obtained by the solar collector.

8. The solar energy system of claim 7 wherein the solar energy system is arranged such that a portion of thermal energy generated from incident solar radiation is provided to the first heat exchange system, and at least a portion of remaining thermal energy generated from incident solar radiation is provided to the water heating system.

9. The solar energy system of claim 1 further comprising an energy storage arrangement for storing energy that is provided by the first heat exchange system and/or the second heat exchange system, and wherein the solar energy system is arranged to use at least a portion of energy stored in the energy storage for cooling or heating the region.

10. The solar energy system of claim 9 wherein the energy storage is arranged for storing thermal energy by transferring the thermal energy to a solid or a fluid.

11. The solar energy system of claim 1 wherein the solar energy system is arranged such that the first heat exchange system is used for heating or cooling and only if a heating or cooling contribution of the first heat exchange system is insufficient for reaching a preselected or predetermined cooling or heating condition, the second heat exchange system is used to supplement the operation of the first heat exchange system.

12. The solar energy system of claim 11 wherein the solar energy system is controlled such that a heating or cooling contribution of the first heat exchange system is substantially maximized dependent on operation conditions before the second heat exchange system is used to supplement the contribution of the first heat exchange systems.

13. The solar energy system of claim 11 wherein a heating or cooling contribution of the second heat exchange system is substantially limited to enabling heating or cooling to reach the preselected or predetermined heating or cooling condition.

14. The solar energy system of claim 11 wherein the first heat exchange system is also arranged to use thermal energy from an energy storage for heating or cooling.

15. The solar energy system of claim 1 wherein the first and second heat exchangers are arranged to function as condensers when transferring thermal energy to the hydronic circuit, and to function as evaporators when transferring thermal energy from the hydronic circuit.

16. The solar energy system of claim 1 wherein the at least one sensor is arranged to provide the information in predetermined intervals and the processor is arranged to control the operation of the second heat exchange system in predetermined time intervals.

17. The solar energy system of claim 1 also comprising a sensor that provides information indicative of an amount of thermal energy that is provideable by a thermal energy storage.

18. The solar energy system of claim 1 wherein the processor is arranged to control usage of thermal energy from an energy storage for operation of the first heat exchange system.

* * * * *